Feb. 22, 1966  N. S. MOSS  3,236,077
THEFT PREVENTION DEVICES
Filed Dec. 23, 1963  2 Sheets-Sheet 1

INVENTOR
NORMAN SIDNEY MOSS
BY *Irwin S. Thompson*
ATTORNEY.

Feb. 22, 1966  N. S. MOSS  3,236,077
THEFT PREVENTION DEVICES
Filed Dec. 23, 1963  2 Sheets-Sheet 2

INVENTOR
NORMAN SIDNEY MOSS
BY Irwin S. Thompson
ATTORNEY

Patent text

United States Patent Office 3,236,077
Patented Feb. 22, 1966

3,236,077
THEFT PREVENTION DEVICES
Norman Sidney Moss, Shirley, Solihull, England, assignor to Wilmot-Breeden Limited, Birmingham, England
Filed Dec. 23, 1963, Ser. No. 332,569
Claims priority, application Great Britain, Dec. 27, 1962, 48,610/62
9 Claims. (Cl. 70—239)

This invention relates to theft prevention devices for use with motor vehicles, and in particular to such devices of the type which act to render inoperable a vital mechanical part of a vehicle to which they are fitted and can only be released by means of the appropriate key. These devices normally act to lock the vehicle steering column.

The object of the invention is to provide a device of the foregoing type which is particularly suited for use with diesel-engined vehicles, both private and commercial, in that in addition to rendering a mechanical part inoperable it also locks in the "stop" position a fuel control member which is operable to cut off the supply of fuel to the vehicle engine. Such a control member of the foregoing nature is normally fitted to a diesel-engined vehicle and is operated by the driver to stop the vehicle engine.

According to the invention a theft prevention device for a vehicle comprises a locking mechanism having a slidable locking member which, when fitted to the vehicle, is interlocked with a fuel control member of the vehicle and in the locking position engages and renders inoperable a vital mechanical part of the vehicle and locks the fuel control member in the stop position. The interlocking feature not only prevents starting of the engine when the device is locked, due to the locking of the fuel control member, but also prevents locking of the device when the fuel control member is in the "run" position.

The slidable locking member may be formed in two parts, namely a control slide part which engages the fuel control member to provide the interlock and a locking bolt part mounted in the control slide and spring loaded therefrom for engagement with said mechanical part of the vehicle. Preferably the locking bolt engages the steering column and the device may also incorporate an electrical switch mechanism which is interlocked with the locking mechanism; for use in private vehicles the switch mechanism conveniently forms the engine starting switch. With commercial vehicles a separate starter switch mounted on the instrument panel will normally be desired, and in this case the switch mechanism of the device may be arranged to act as an isolator through which a separate starter switch is energised.

The switch mechanism may be key operated and so interlocked with the locking mechanism that the latter cannot be operated unless the key is in a central neutral position. The locking mechanism may be spring loaded to the inoperative position and interlocked with the switch mechanism in such manner that with the key removed, or at least in the central position, the locking mechanism is held against the spring loading when moved to the locking position. The arrangement may further be such that the key must be inserted and turned in one direction to release the locking mechanism which then moves to the inoperative position under the spring loading to unlock the steering and free the fuel control member, and the key must thereafter be turned in the opposite direction beyond the central position either to start the engine in the case of a private vehicle or, in the case of a commercial vehicle, to operate the switch mechanism to energise the separate starter switch.

The control slide may either project from a housing of the device for movement to the locking position or be accessible through an aperture in the wall of the housing so that such locking movement can be produced. The control slide may also be formed to cooperate with an element of the key-operated switch mechanism to provide the switch/lock interlocking feature, and that element may be a shaft interconnecting a key-operated lock of the switch mechanism with the switch proper.

The device is conveniently arranged for mounting on the steering column and the housing is conveniently split to enable it to be mounted on and clamped to the tubular casing of the column. The housing may provide a mounting for the fuel control member which conveniently takes the form of a shaft slidably mounted in the housing, the latter member being connected at one end through a flexible cable to a fuel supply valve which it controls and terminating at the opposite end in a knob which may be grasped and moved by the vehicle driver to stop the engine.

The invention will now be further described with reference to the accompanying drawings which illustrate, by way of example, a theft prevention device in accordance with the invention. In the drawings.

Figure 3:
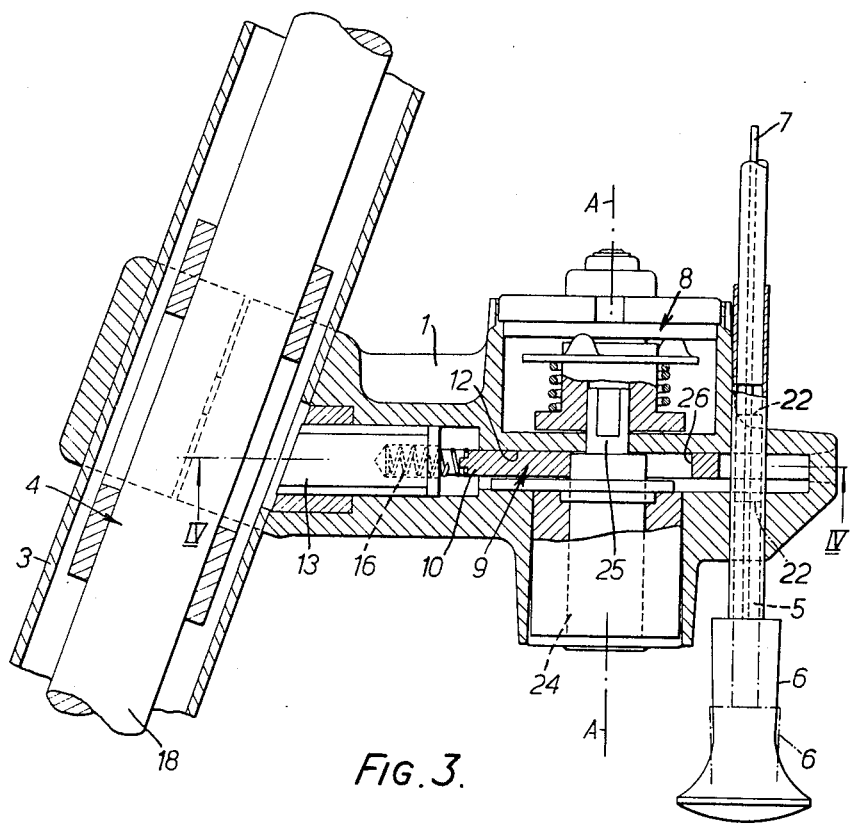
FIGURE 3 is a sectional view on the line III—III in FIGURE 2.

The device comprises a diecast housing 1 which is split at 2 to enable it to be clamped to the tubular casing 3 of the vehicle steering column 4 with the main body of the device downwardly and to the righthand side of the column. Towards the outer end of the housing a shaft-like fuel control member 5 is slidably mounted, the member 5 terminating in a control knob 6 at the forward end facing the driver and being connected through a flexible cable 7 to a fuel control valve (not shown). In known manner the fuel control member 5 is pulled by the driver to the "stop" position, bringing the knob 6 to the position shown in broken lines in FIGURE 3, to stop the engine.

A key-operated switch mechanism 8 is mounted at an intermediate position in the housing 1, the rotary axis A—A of the mechanism 8 being substantially horizontal when the device is mounted and parallel to the direction of sliding movement of the control member 5. A locking mechanism 9 mounted in the housing 1 and interlocked with the control member 5 and the switch mechanism is arranged laterally of the axis A—A and positioned mainly between the steering column 4 and the control member 5. The mechanism 9 includes a slidable locking member comprising two parts; a control slide part 10 which is of generally rectangular cross-section and mounted in a slideway 12 in the housing 1 at right angles to the axis A—A, and a locking bolt part 13 which projects from the inner or upper end of the slide 10.

Figure 1:
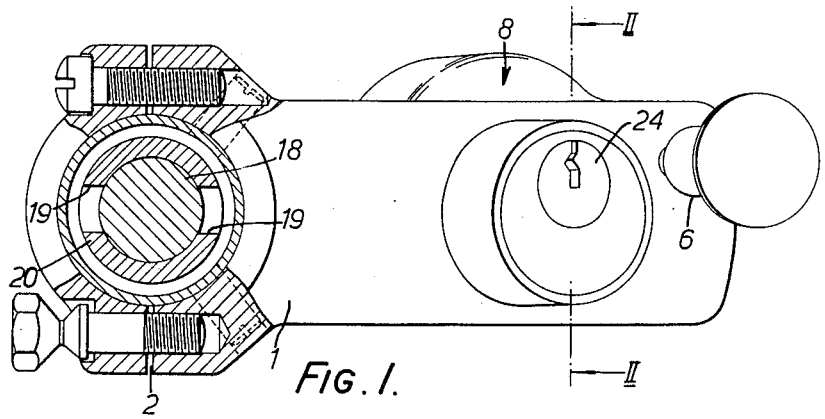
FIGURE 1 is a front view of the device clamped to the steering column of the vehicle, the column and immediately adjacent parts of the device being shown in section.
Figure 2:
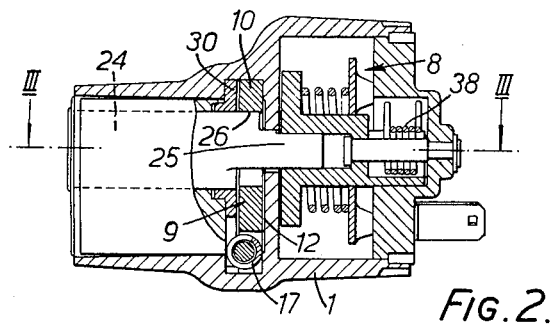
FIGURE 2 is a sectional view on the line II—II in Figure 1.
Figure 4:
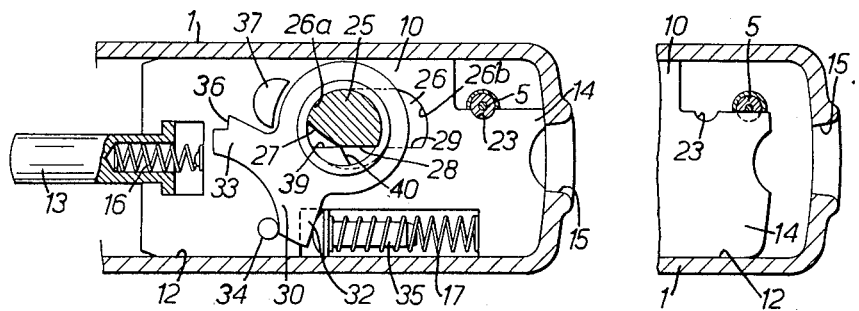
FIGURE 4 is a detail sectional view on the line IV—IV in Figure 3, showing a control slide of the device in the unlocked position.

At the lower end the slide 10 has a projecting tongue 14 which, in the inoperative or unlocked position as shown particularly in FIGURE 4, terminates just within an aperture 15 in the end of the housing 1. The aperture 15 is of a shape to admit freely the key which operates the switch mechanism 8, insertion of the key enabling the slide 10 to be displaced to the operative or locking position shown in FIGURE 5.

The sliding bolt 13 is arranged in the control slide 10 with a maximum projection from the upper end of the latter and is spring loaded by a spring 16 from the slide 10 upwardly towards the steering column. A return spring 17 in the housing 1 urges the control slide 10 downwardly towards the inoperative position as shown in FIGURE 4. When the slide 10 is moved inwardly against the spring 17 to the operative or locking position, in which position it is retained in a manner described hereinafter, the bolt 13 is resiliently urged by the spring 16 into engagement with the central shaft 18 of the steering column 4 for entry into either of two locking recesses 19 in a collar 20 of the shaft 18. The tongue 14 on the slide 10 is arranged below the fuel control member 5 and the inner end 22 of the latter is disposed in front of the tongue 14 when the control member 5 is in the stop position (see FIGURE 3); in the inoperative position of the slide 10 an arcuate side notch 23 in the tongue 14 is aligned with the control member 5 and allows movement of the latter between the "stop" and "run" positions.

Figure 5:
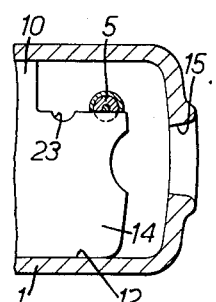
FIGURE 5 is a detail view of the same section line showing the control slide in the locking position.

Thus in the run position of the control member 5 the latter engages the notch 23 in the slide tongue 14 (as shown in FIGURE 4) and prevents the slide 10 being moved to lock the steering column 4 with the engine running. When the control member 5 has been moved to the stop position the slide 10 can be moved in the housing 1 to the locking position, in which the slide tongue 14 passes behind the end 22 of the control member 5 (as shown in FIGURE 5) immediately below the cable 7 and the latter cannot be moved to the run position as such movement is blocked by engagement of the end 22 with the slide tongue 14; thus the engine cannot be started whilst the steering column 4 is still locked.

The switch mechanism 8 comprises a pin-tumbler type key-operated lock 24 which is connected through a shaft 25 to the switch proper, the shaft 25 passing through an aperture 26 in the slide 10. The shaft 25 has a normal circular cross-section, and over a portion of its length coextensive with the slide 10 the shaft 25 is cut away to provide a reduced section bounded by two chords at 27 and 28 (see FIGURE 4). The slide aperture 26 is elongated in the direction of the slide axis, having as shown in FIGURE 4, a circular inner end portion 26a which adjoins a part circular outer end portion 26b bounded by a chord to provide a flat chordal step at 29 with which the shaft 25 engages in a manner to be described.

A pawl 30 is mounted with a degree of angular lost motion at one side of the slide 10 on the shaft 25 and has two projecting arms 32 and 33. The arm 32 is urged into engagement with a stop pin 34 on the slide 10 by a retraction pin 35 mounted in the inner end of the spring 17. The arm 33 has a cut-out step 36 which, when the slide 10 is in the locking position and the shaft 25 in the aperture portion 26b, engages the bottom corner of an undercut interlock pin 37, projecting from the slide. Such engagement occurs under the influence of the return spring 17, the arm 32 now being clear of the pin 34.

When the slide 10 is in the inoperative position and the shaft 25 passes through the slide aperture portion 26a the shaft can be turned freely to operate the switch mechanism 8. A torsion spring 38 centres the shaft 25 so that with the key removed it takes up a central neutral position in the aperture portion 26a with the chordal surface 28 (as shown in FIGURE 4) aligned with the chordal step 29. The device in this condition can be considered as fully inoperative, i.e. the steering is unlocked and both the switch shaft 25 and the fuel control member 5 can be moved freely.

If the slide 10 is moved inwardly to the locking position (shown in FIGURE 5) to lock the steering column 4, conveniently by inserting the switch key or any other suitable member through the housing aperture 15, and displacing the slide 10 directly, the shaft 25 moves into the slide aperture portion 26b. As it does so the movement of the pin 34 allows the spring 17 to turn the pawl the arm 33 of which clicks into position behind the pin 37 to retain the slide 10 in the locking position. As already described, before the locking mechanism can be rendered operative in this matter it is necessary for the fuel control member 5 to be in the stop position, and when the steering column 4 is locked so is the control member 5.

In order to free the locking mechanism 9 and release the steering column 4 and the control member 5, it is necessary to insert the key in the lock 24 and turn the latter from the central neutral position in an anti-clockwise direction; this brings the chordal surface 27 of the shaft 25 into engagement with a chordal step 39 formed on the pawl 30. As a result the pawl arm 33 is turned clear of the pin 37 and the slide 10 is returned by the spring 17 to the inoperative position shown in detail in FIGURE 4. Return movement of the slide 10 brings the shaft 25 into the aperture portion 26a in which it can now be turned freely in the clockwise direction to operate the switch mechanism which controls the starting circuit of the vehicle. When the slide 10 is in the locking position abutment of the chordal surface 28 of the shaft 25 on the chordal step 29 prevents the shaft 25 being turned in the clockwise switch operating direction. Said angular lost motion of the pawl 30 is limited by abutment of the shaft surfaces 27 and 28 with said step 39 and a further adjoining chordal step 40 on the pawl.

It will be clear that the switch and locking mechanisms 8 and 9 and the fuel control member 5 are completely interlocked so that the hazardous circumstances of an attempt to drive the vehicle with the steering column 4 locked cannot arise. If the engine is running or the fuel control member 5 is in a position which would allow the engine to be started the steering column 4 cannot be locked; if the steering column 4 is locked not only is the fuel control member 5 also locked in the stop position but the switch cannot be turned in the operative clockwise direction.

I claim:

1. A theft prevention device for a vehicle, comprising a housing, a key-operated switch mechanism mounted in the housing, a locking member formed for engagement with a mechanical part of the vehicle and slidably mounted in the housing, spring means loading the locking member towards an unlocked position, in the unlocked position the locking member being operable independently of the switch mechanism to move the member to the locking position against the spring loading, a pawl member which acts to retain the locking member in the locking position, and a fuel control member which passes through the housing transversely of the locking member; the locking member and the fuel control member being formed to cooperate in such manner as to allow operation of the fuel control member when the locking member is in the unlocked position but not when the locking member is in the locking position, and to allow movement of the locking member when the fuel control member is in an inoperative position but not when the fuel control member is in the operative position, and the switch mechanism being interlocked with the locking member in such manner that the switch cannot be operated if the locking member is in the locking position.

2. A theft prevention device according to claim 1, wherein the slidable locking member is formed in two parts; a control slide part which engages the fuel control member, and a locking bolt part which is spring loaded relatively to the control slide for engagement with said mechanical part.

3. A theft prevention device according to claim 1, wherein the locking member is notched to cooperate with the fuel control member for interlocking purposes; in the inoperative position of the locking member the notch in the latter allowing free movement of the fuel control member which engages that notch to prevent movement of the locking member when the control member is in the "run" position, and in the locking position the locking member blocking the control member to prevent movement of the latter from the stop position.

4. A theft prevention device for a vehicle, comprising a housing for mounting on a steering column of the vehicle, a key-operated switch mechanism mounted in the housing, a locking member formed for engagement with the steering column to immobilise the vehicle and slidably mounted in the housing, spring means loading the locking member towards an unlocked position, in the unlocked position the locking member being accessible from outside the housing through an aperture in the latter to move the member to the locking position against the spring loading, a pawl member which acts to retain the locking member in the locking position, and a fuel control member which passes through the housing transversely of the locking member; the locking member and the fuel control member being formed to cooperate in such manner as to allow operation of the fuel control member when the locking member is in the unlocked position but not when the locking member is in the locking position, and to allow movement of the locking member when the fuel control member is in an inoperative position but not the operative position, and the switch mechanism being interlocked with the locking member in such manner that the switch cannot be operated if the locking member is in the locking position and the locking member cannot be moved to the locking position if the switch mechanism is in the operative position.

5. A theft prevention device for a vehicle, comprising a housing, a key-operated lock and a switch mechanism mounted in the housing, a switch-operating shaft coupling the lock and switch mechanism, a locking member formed for engagement with a mechanical part of the vehicle and slidably mounted in the housing, spring means loading the locking member towards an unlocked position, in the unlocked position the locking member being operable independently of the key-operated lock to move the member to the locking position against the spring loading, a pawl member which acts to retain the locking member in the locking position, and a fuel control member which passes through the housing transversely of the locking member; the locking member and the fuel control member being formed to cooperate in such manner as to allow operation of the fuel control member when the locking member is in the unlocked position but not when the locking member is in the locking position, and to allow movement of the locking member when the fuel control member is in an inoperative position but not the operative position, and the switch-locking member and engaging therewith in such manner that the switch cannot be operated if the locking member is in the locking position and the locking member cannot be moved to the locking position if the switch mechanism is in the operative position.

6. A theft prevention device according to claim 5, wherein an aperture in the locking member and a cut-away section of the switch shaft are so contoured as to prevent turning of the shaft in the switch-operating direction when the locking member is in the locking position.

7. A theft prevention device according to claim 6, wherein the pawl is mounted on the switch shaft with a degree of angular lost motion sufficient to enable the pawl to turn to the retaining position on movement of the locking member to the locking position, thereafter movement of the shaft in the unlocking direction initially taking up the lost motion and then turning the pawl away from the retaining position to free the locking member.

8. A theft prevention device according to claim 5, the arrangement being such that with the device locked the key must be inserted and turned in an unlocking direction from a central neutral position to release the pawl member which allows the locking member to move to the unlocked position under the spring loading, the key thereafter being turned in the opposite switch-operating direction beyond the central position to operate the switch mechanism.

9. The theft prevention device according to claim 8, wherein said pawl is spring loaded towards a retaining position in which it prevents return movement of the locking member when in the locking position, turning of the key in the unlocking direction and moving the pawl against the spring loading to free the locking member.

References Cited by the Examiner

UNITED STATES PATENTS

| | | | |
|---|---|---|---|
| 1,238,989 | 9/1917 | Cooper | 70—181 |
| 1,592,091 | 6/1926 | Fairchild | 70—185 X |
| 1,691,774 | 12/1928 | Matson | 70—239 |
| 1,838,891 | 12/1931 | Van Sickel | 70—185 X |
| 1,945,527 | 2/1934 | Gilpin | 70—252 |
| 2,868,007 | 1/1959 | Neiman et al. | 70—252 |

FOREIGN PATENTS 485,990  10/1953  Italy.

ALBERT H. KAMPE, *Primary Examiner.*

BOBBY R. GAY, *Examiner.*